(12) United States Patent
Clark (10) Patent No.: US 10,836,321 B1
(45) Date of Patent: Nov. 17, 2020

(54) TRUCK BED LADDER (71) Applicant: William Clark, Dillon, SC (US)

(72) Inventor: William Clark, Dillon, SC (US)

( * ) Notice: Subject to any disclaimer, the term of this patent is extended or adjusted under 35 U.S.C. 154(b) by 0 days.

(21) Appl. No.: 16/538,977

(22) Filed: Aug. 13, 2019

(51) Int. Cl.
*B60R 3/00* (2006.01)
*B60R 3/02* (2006.01)

(52) U.S. Cl.
CPC ........................... *B60R 3/02* (2013.01)

(58) Field of Classification Search
CPC ........................................................ B60R 3/02
USPC ........................................................ 224/404
See application file for complete search history.

(56) References Cited

U.S. PATENT DOCUMENTS

| | | | |
|---|---|---|---|
| 4,492,286 A | 1/1985 | Lemire | |
| 4,848,821 A * | 7/1989 | Llewellyn | B60R 3/02 296/62 |
| 5,205,603 A * | 4/1993 | Burdette, Jr. | B60R 3/02 182/195 |
| 6,015,027 A * | 1/2000 | Banks | E06C 7/081 182/196 |
| 6,116,378 A | 9/2000 | Barrow | |
| 6,270,139 B1 | 8/2001 | Simpson | |
| D479,884 S | 9/2003 | Berryman | |
| 7,159,693 B2 * | 1/2007 | Mettler | A62B 3/00 182/195 |
| D539,922 S | 4/2007 | Donovan | |
| 2002/0070577 A1 * | 6/2002 | Pool, III | B60R 3/02 296/62 |
| 2002/0189903 A1 | 12/2002 | Krish | |
| 2003/0188925 A1 * | 10/2003 | Korpi | B60R 3/02 182/127 |
| 2004/0069566 A1 * | 4/2004 | Bareket | E06C 5/04 182/97 |
| 2015/0307029 A1 | 10/2015 | Glovak | |

* cited by examiner

*Primary Examiner* — Peter N Helvey (57) ABSTRACT

The truck bed ladder is configured for use with a pickup truck. The pickup truck is further defined with a bed. The truck bed ladder comprises a collapsible ladder and a bed box. The collapsible ladder is stored in the bed box. The bed box mount underneath the bed of the pickup truck such that the superior surface of the bed box is accessible from the bed. The bed box is accessed through the bed of the pickup truck. The collapsible ladder is a structure used by an individual to change elevation. The collapsible ladder is a collapsible structure. The collapsible ladder collapses into a rectangular block structure that is contained in the bed box. The collapsible ladder deploys into a linear structure used by an individual to change elevation.

15 Claims, 7 Drawing Sheets

TRUCK BED LADDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including vehicle fittings not otherwise provided for, more specifically, a retractable ladder. (B60R3/02)

SUMMARY OF INVENTION

The truck bed ladder is configured for use with a pickup truck. The pickup truck is further defined with a bed. The truck bed ladder comprises a collapsible ladder and a bed box. The collapsible ladder is stored in the bed box. The bed box mount underneath the bed of the pickup truck such that the superior surface of the bed box is accessible from the bed. The bed box is accessed through the bed of the pickup truck. The collapsible ladder is a structure used by an individual to change elevation. The collapsible ladder is a collapsible structure. The collapsible ladder collapses into a rectangular block structure that is contained in the bed box. The collapsible ladder deploys into a linear structure used by an individual to change elevation. The pickup truck is defined elsewhere in this disclosure.

These together with additional objects, features and advantages of the truck bed ladder will be readily apparent to those of ordinary skill in the art upon reading the following detailed description of the presently preferred, but nonetheless illustrative, embodiments when taken in conjunction with the accompanying drawings.

In this respect, before explaining the current embodiments of the truck bed ladder in detail, it is to be understood that the truck bed ladder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the truck bed ladder.

It is therefore important that the claims be regarded as including such equivalent construction insofar as they do not depart from the spirit and scope of the truck bed ladder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
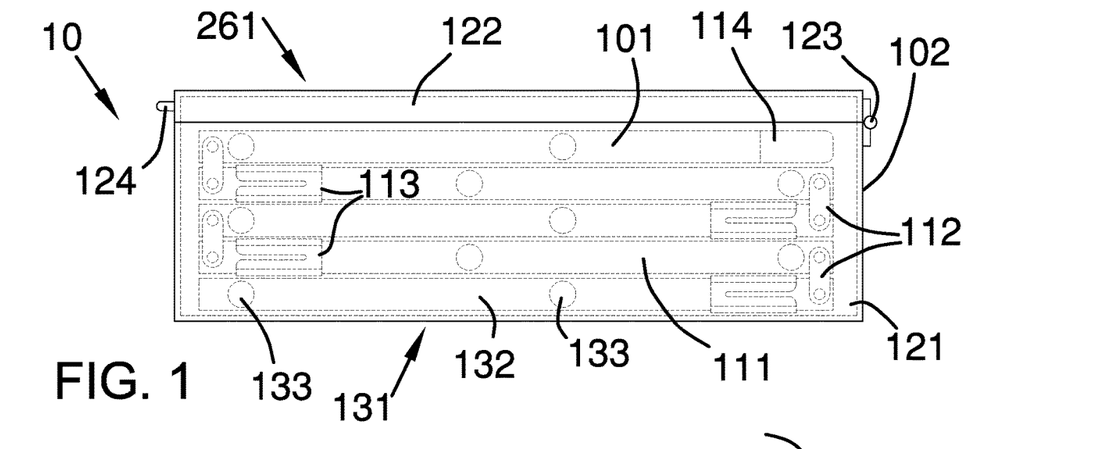
FIG. 1 is a side view of a device of the disclosure.
Figure 2:
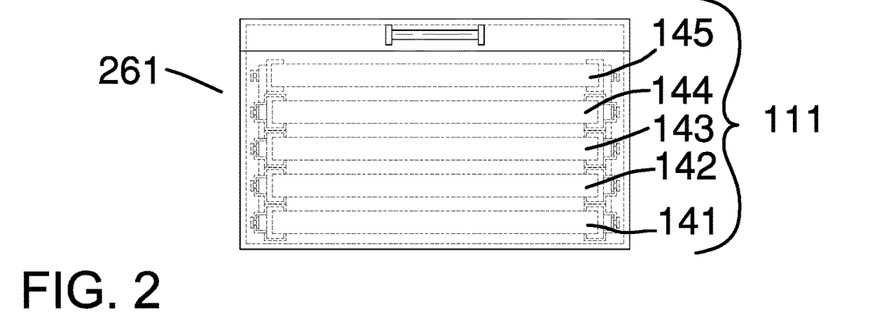
FIG. 2 is a front view of a device of the disclosure.
Figure 3:
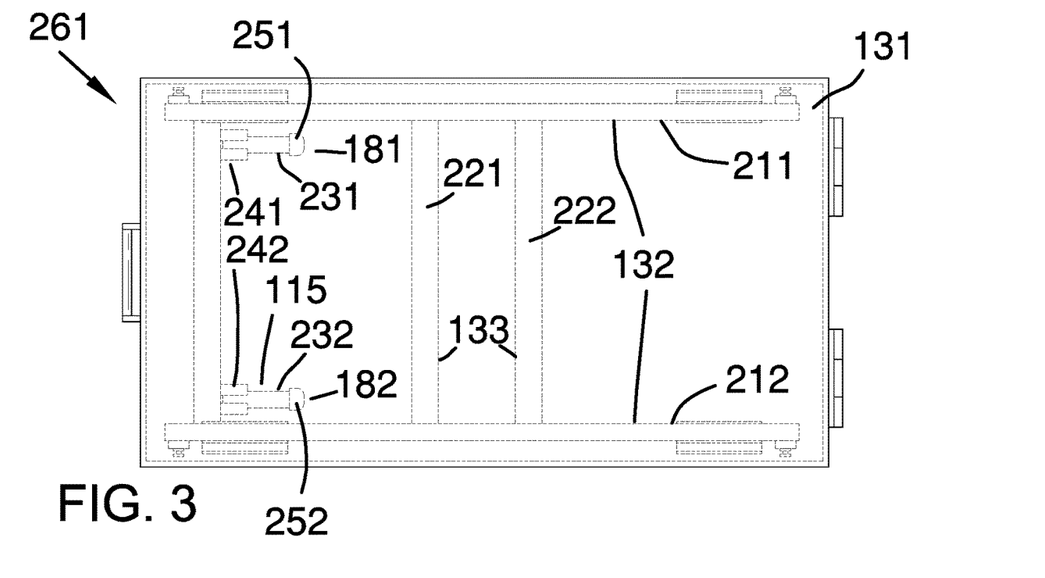
FIG. 3 is a top view of a device of the disclosure.
Figure 4A:
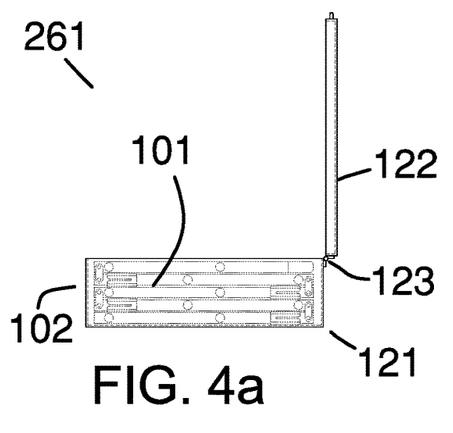
FIG. 4a is an in-use view of a device of the disclosure.
Figure 4B:
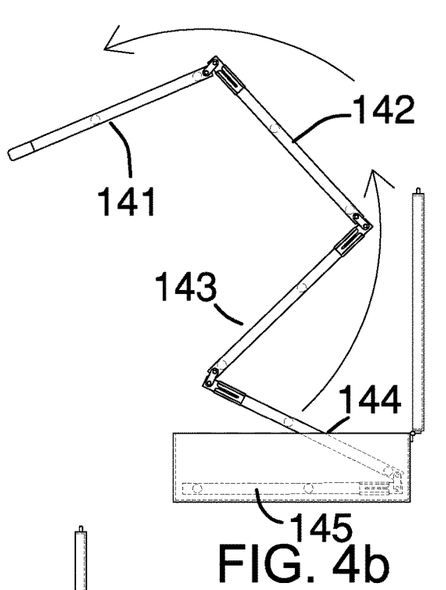
FIG. 4b is an in-use view of a device of the disclosure.
Figure 4C:
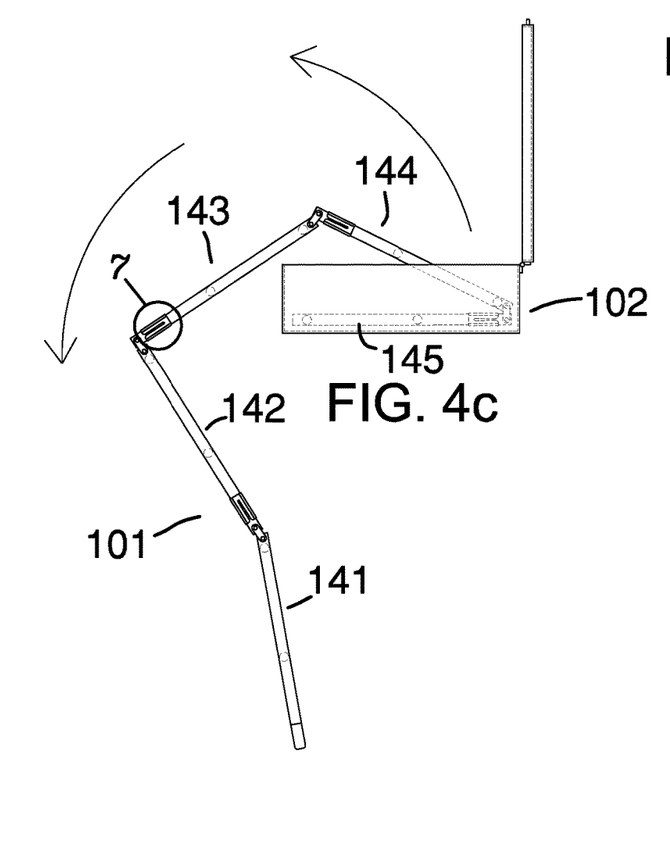
FIG. 4c is an in-use view of a device of the disclosure.
Figure 4D:
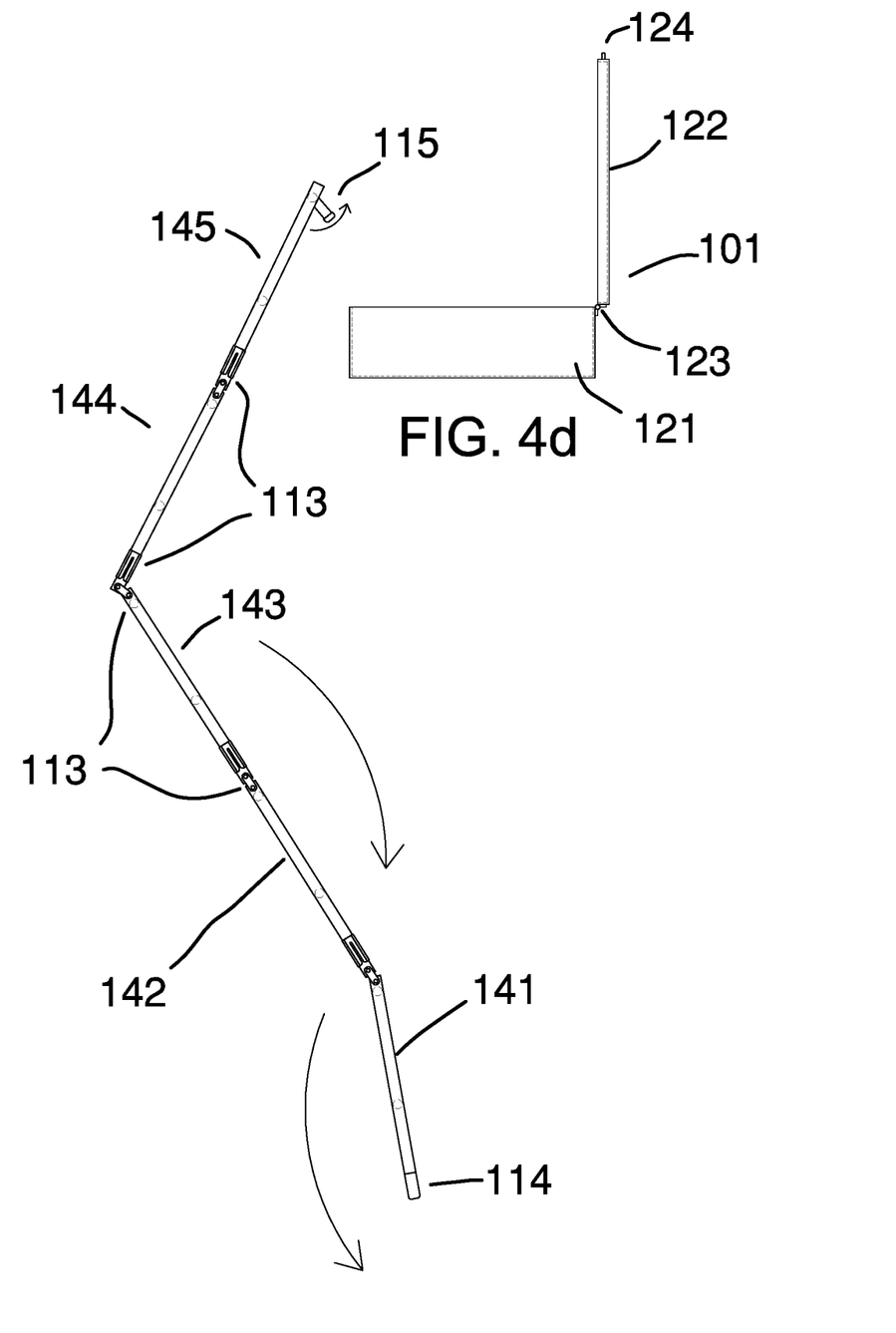
FIG. 4d is an in-use view of a device of the disclosure.
Figure 4E:
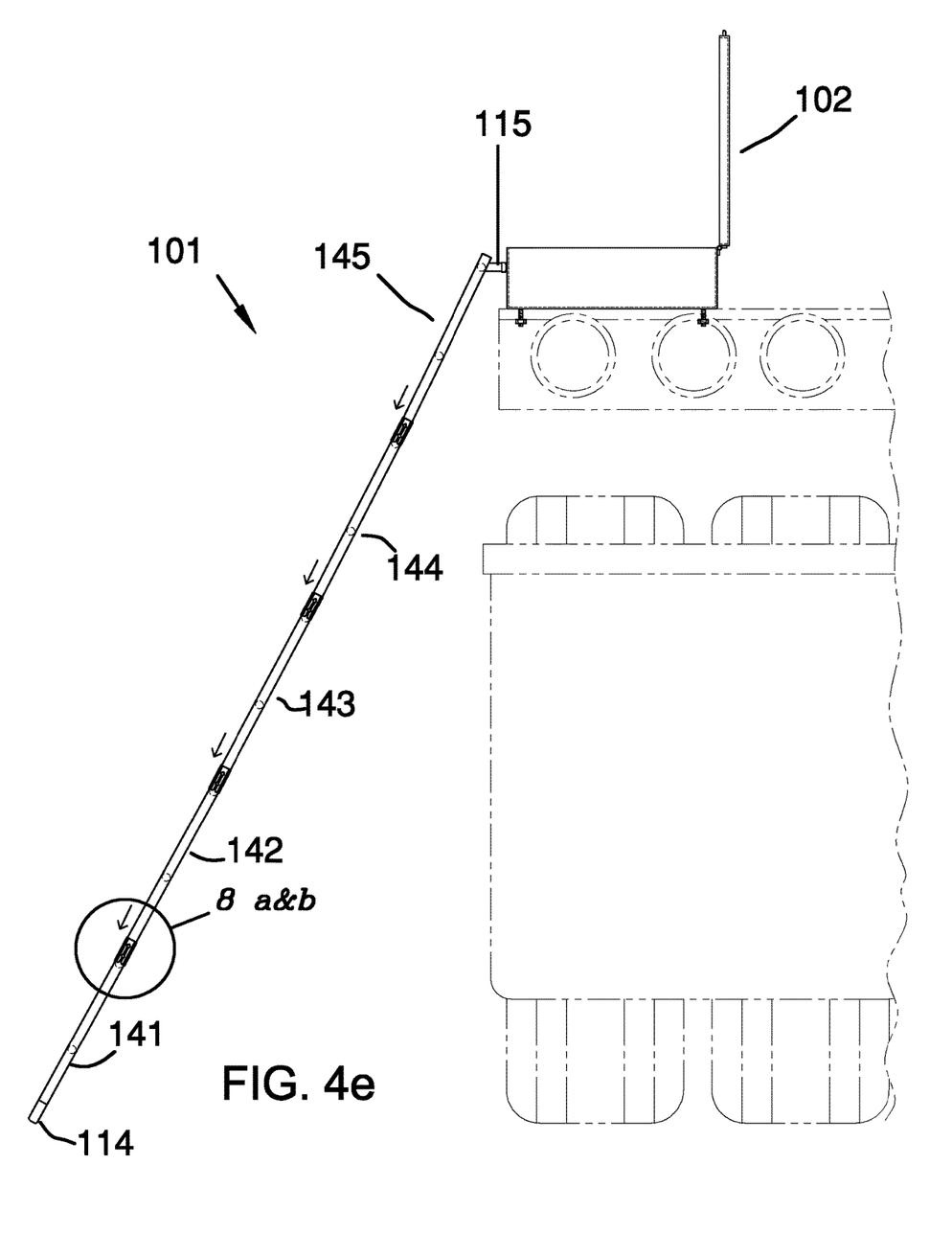
FIG. 4e is an in-use view of a device of the disclosure.
Figures 5, 6:
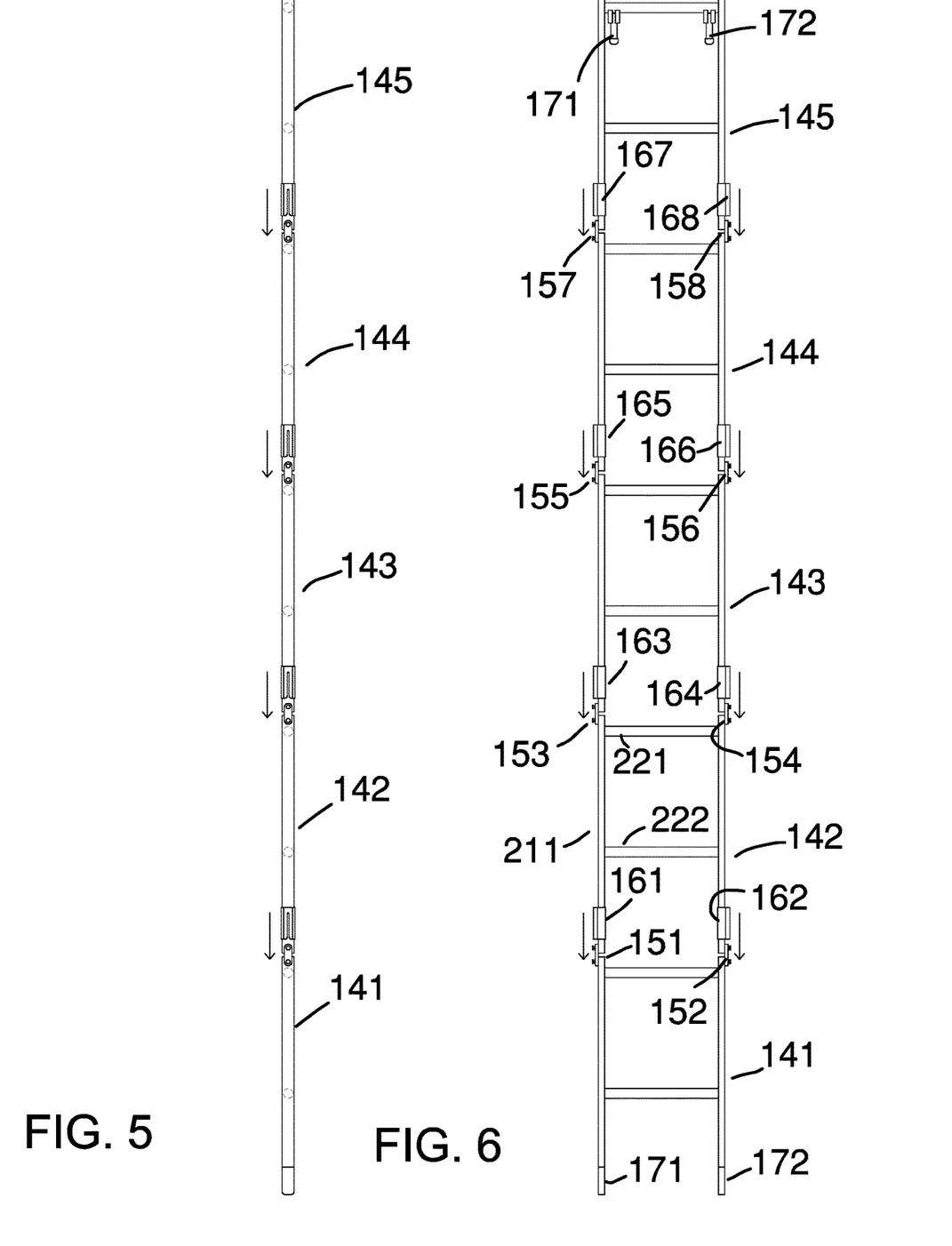
FIG. 5 is a side extended view of a device of the disclosure.
FIG. 6 is a front extended view of a device of the disclosure.
Figures 7, 8A, 8B:
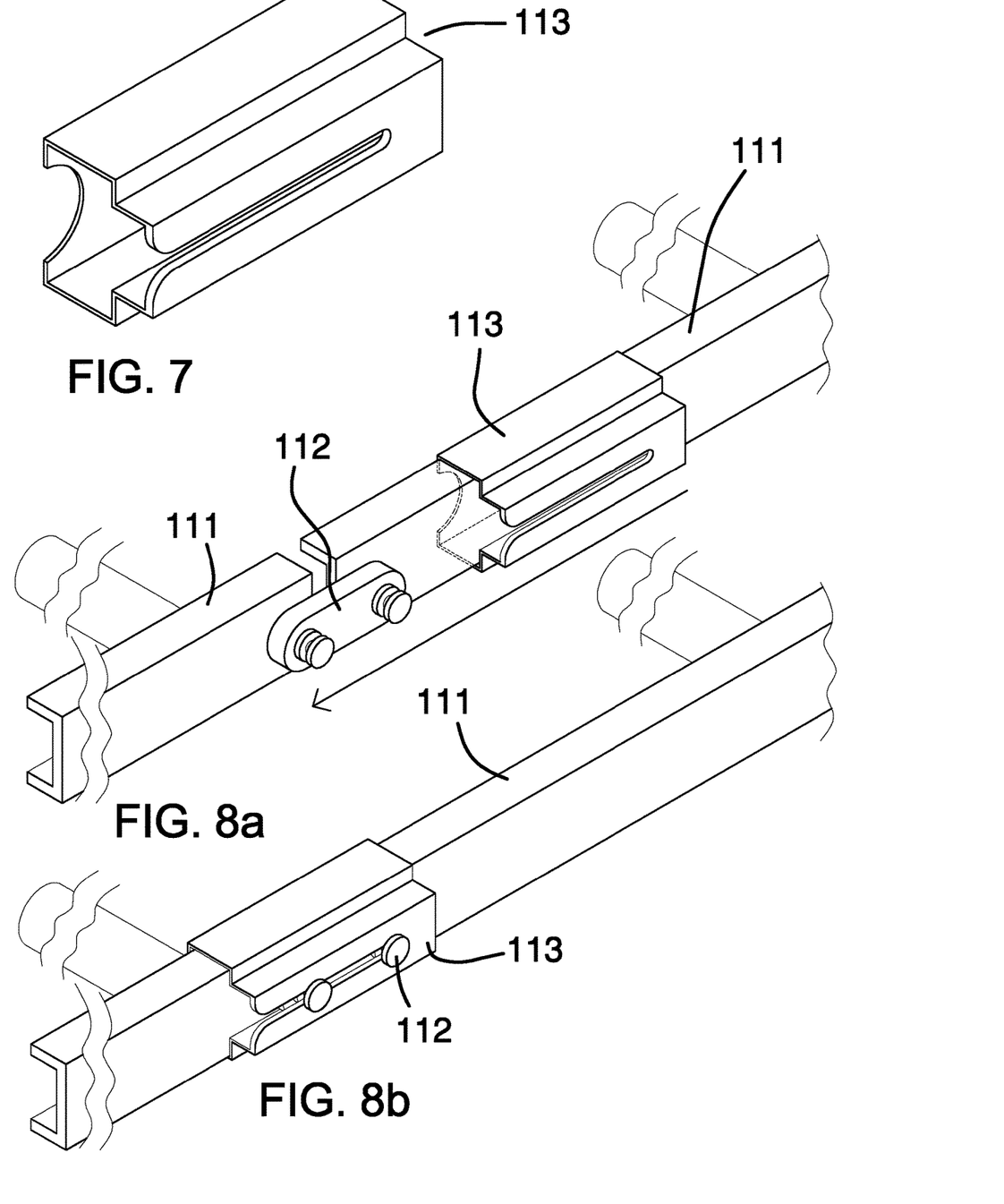
FIG. 7 is a detail view of a device of the disclosure.
FIG. 8a is a detail view of a device of the disclosure.
FIG. 8b is a detail view of a device of the disclosure.
Figure 9:
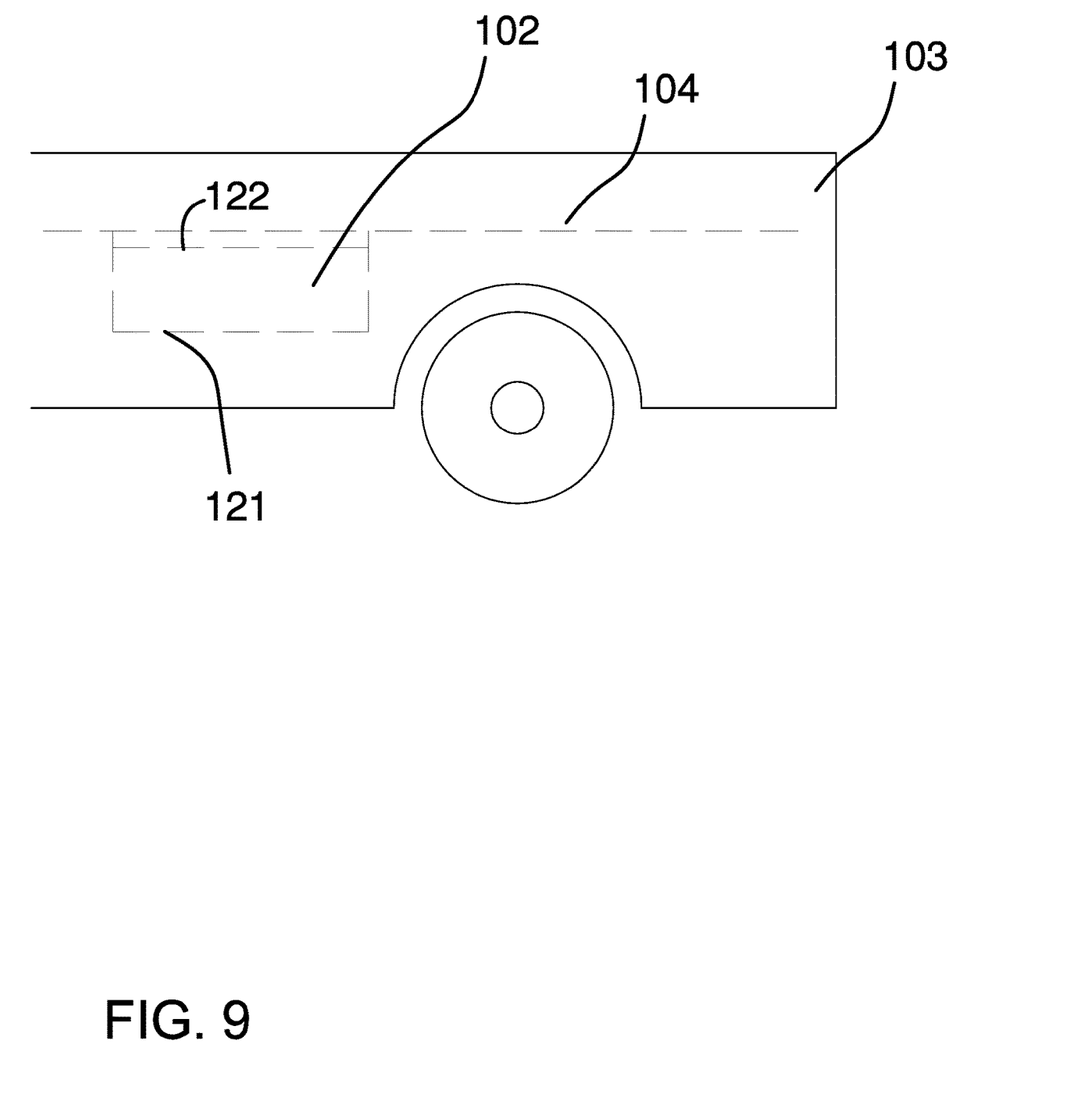
FIG. 9 is an in-use view of a device of the disclosure.

Detailed reference will now be made to one or more potential embodiments of the disclosure, which are illustrated in FIGS. 1 through 9.

The truck bed ladder 100 (hereinafter invention) is configured for use with a pickup truck 103. The pickup truck 103 is further defined with a bed 104. The invention 100 comprises a collapsible ladder 101 and a bed 104 box 102. The collapsible ladder 101 is stored in the bed 104 box 102. The bed 104 box 102 mounts underneath the bed 104 of the pickup truck 103 such that the superior surface of the bed 104 box 102 is accessible from the bed 104. The bed 104 box 102 is accessed through the bed 104 of the pickup truck 103. The collapsible ladder 101 is a structure used by an individual to change elevation. The collapsible ladder 101 is a collapsible structure. The collapsible ladder 101 collapses into a rectangular block structure that is contained in the bed 104 box 102. The collapsible ladder 101 deploys into a linear structure used by an individual to change elevation. The pickup truck 103 is defined elsewhere in this disclosure.

The pickup truck 103 a motorized vehicle. The pickup truck 103 is defined elsewhere in this disclosure. The bed 104 is the supporting surface of the open body of the pickup truck 103. The bed 104 supports the loads carried by the pickup truck 103.

The collapsible ladder 101 is further defined with a collapsed position 261 and an extended position 262. The collapsed position 261 is the position of the collapsible ladder 101 when the collapsible ladder 101 is folded into a storage position. The extended position 262 is the position of the collapsible ladder 101 when the collapsible ladder 101 is extended and deployed for use.

The bed 104 box 102 is a hollow containment structure. The bed 104 box 102 is a prism-shaped structure. The bed 104 box 102 contains the collapsible ladder 101 when the collapsible ladder is in the collapsed position 261. The bed 104 box 102 mounts in the bed 104 of the pickup truck 103 such that the superior surface of the prism structure of the bed 104 box 102 is flush with the superior surface of the bed 104. The bed 104 box 102 comprises a pan 121, a lid 122, a bed 104 box 102 hinge 123, and a handle 124.

The pan 121 is a hollow structure. The pan 121 is a prism-shaped structure. The pan 121 has a pan 121 structure. The pan 121 is sized such that the pan 121 receives the collapsible ladder 101 when the collapsible ladder 101 is in the collapsed position 261. The pan 121 mounts below the horizontal surface formed by the bed 104 of the pickup truck 103 such that the pan 121 will not interfere with cargo stored on the bed 104 of the pickup truck 103. The open face of the pan 121 is the superior face of the pan 121 such that the interior of the pan 121 is accessible through the bed 104 of the pickup truck 103.

The lid 122 is a disk-shaped structure. The lid 122 is geometrically similar to the pan 121 such that the lid 122 encloses the open face of the pan 121. The lid 122 encloses the open face of the pan 121. The lid 122 attaches to the pan 121 such that the lid 122 rotates relative to the pan 121. The lid 122 mounts within the bed 104 of the pickup truck 103 such that the lid 122 is flush with the superior surface of the bed 104 when the lid 122 encloses the hollow interior storage space of the pan 121.

The bed 104 box 102 hinge 123 is a hinge. The bed 104 box 102 hinge 123 attaches the lid 122 to the pan 121 such that the lid 122 rotates relative to the pan 121. The handle 124 is a grip that attaches to the lid 122. The handle 124 is used to manipulate the lid 122.

The collapsible ladder 101 is a mechanical structure. The collapsible ladder 101 is a rotating structure. The collapsible ladder 101 is an extendable structure that is deployed such that an individual can climb the collapsible ladder 101 to change elevation. The collapsible ladder 101 folds on itself to collapse into a position that allows the collapsible ladder 101 to be stored in the bed 104 box 102. The collapsible ladder 101 comprises a plurality of ladder segments 111, a plurality of segment hinges 112, a plurality of slipover braces 113, a plurality of foot cushions 114, and a plurality of standoff legs 115.

Each of the plurality of ladder segments 111 is a ladder. Each of the plurality of ladder segments 111 forms a portion of the climbing structure of the collapsible ladder 101. The plurality of ladder segments 111 are interconnected to each other to form the collapsible ladder 101. Any individual ladder segment 131 selected from the plurality of ladder segments 111 rotates relative any individual ladder segment 131 remaining in the plurality of ladder segments 111. As shown most clearly in the FIG. 4 sequence, any individual ladder segment 131 selected from the plurality of ladder segments 111 locks into a fixed position relative to the individual ladder segment 131 remaining in the plurality of ladder segments 111 when the collapsible ladder 101 is in the extended position 262. The plurality of ladder segments 111 fold on top of each other to collapse the collapsible ladder 101 into the collapsed position 261. The plurality of ladder segments 111 comprises a collection of individual ladder segments 131.

Each individual ladder segment 131 is a ladder. Any first individual ladder segment 131 selected from the plurality of ladder segments 111 attaches to a second individual ladder segment 131 selected from the plurality of ladder segments 111 to form the collapsible ladder 101. Any first individual ladder segment 131 selected from the plurality of ladder segments 111 rotates relative to a second individual ladder segment 131 selected from the plurality of ladder segments 111 such that the collapsible ladder 101 deploys into the extended position 262 and folds into the collapsed position 261. Each individual ladder segment 131 comprises a plurality of rails 132 and a plurality of rungs 133.

The plurality of rails 132 are stanchion structures that vertically support the plurality of rungs 133 of the individual ladder segment 131 when the collapsible ladder 101 is in the extended position 262. The plurality of rails 132 comprises a left rail 211 and a right rail 212. The left rail 211 is the rail of the individual ladder segment 131 that is in a position to the left of the right rail 212 when the individual ladder segment 131 is viewed from the front. The right rail 212 is the rail of the individual ladder segment 131 that is in a position to the right of the left rail 211 when the individual ladder segment 131 is viewed from the front.

The plurality of rungs 133 are beam structures that horizontally stabilize the plurality of rails 132 of the individual ladder segment 131 when the collapsible ladder 101 is in the extended position 262. The plurality of rungs 133 forms the horizontally oriented support that allows an individual to elevate themselves above a supporting surface. The plurality of rungs 133 comprises a superior rung 221 and an inferior rung 222. The superior rung 221 is the rung of the individual ladder segment 131 that is in a superior position relative to the inferior rung 222 when the individual ladder segment 131 is viewed from the front. The inferior rung 222 is the rung of the individual ladder segment 131 that is in an inferior position relative to the superior rung 221 when the individual ladder segment 131 is viewed from the front.

The plurality of ladder segments 111 further comprises a first ladder segment 141, a second ladder segment 142, a third ladder segment 143, a fourth ladder segment 144, and a fifth ladder segment 145.

The first ladder segment 141 forms the inferior structure of the collapsible ladder 101 when the collapsible ladder 101 is in the extended position 262. The first ladder segment 141 attaches to the second ladder segment 142. The first ladder segment 141 is further defined with a first left rail, a first right rail, a first superior rung, and a first inferior rung.

The second ladder segment 142 forms a portion of the structure of the collapsible ladder 101 when the collapsible ladder 101 is in the extended position 262. The second ladder segment 142 attaches to the first ladder segment 141 and the third ladder segment 143. The second ladder segment 142 is further defined with a second left rail, a second right rail, a second superior rung, and a second inferior rung.

The third ladder segment 143 forms a portion of the structure of the collapsible ladder 101 when the collapsible ladder 101 is in the extended position 262. The third ladder segment 143 attaches to the second ladder segment 142 and the fourth ladder segment 144. The third ladder segment 143 is further defined with a third left rail, a third right rail, a third superior rung, and a third inferior rung.

The fourth ladder segment 144 forms a portion of the structure of the collapsible ladder 101 when the collapsible ladder 101 is in the extended position 262. The fourth ladder segment 144 attaches to the third ladder segment 143 and the fifth ladder segment 145. The fourth ladder segment 144 is further defined with a fourth left rail, a fourth right rail, a fourth superior rung, and a fourth inferior rung.

The fifth ladder segment 145 forms the superior structure of the collapsible ladder 101 when the collapsible ladder 101 is in the extended position 262. The fifth ladder segment 145 attaches to the fourth ladder segment 144. The fifth ladder segment 145 is further defined with a fifth left rail, a fifth right rail, a fifth superior rung, and a fifth inferior rung.

Each of the plurality of segment hinges 112 is a hinge. Each of the plurality of segment hinges 112 attaches a first rail selected from the plurality of rails 132 of a first individual ladder segment 131 selected from the plurality of ladder segments 111 to a second rail selected from the plurality of rails 132 of a second individual ladder segment 131 selected from the plurality of ladder segments 111. Each segment hinge selected from the plurality of segment hinges 112 attaches the first rail to the second rail such that the first rail rotates relative to the second rail. The plurality of segment hinges 112 interconnect the plurality of ladder segments 111 such that any first individual ladder segment 131 selected from the plurality of ladder segments 111 rotates relative to any second individual ladder segment 131 selected from the plurality of ladder segments 111.

The plurality of segment hinges 112 comprises a first segment hinge 151, a second segment hinge 152, a third segment hinge 153, a fourth segment hinge 154, a fifth segment hinge 155, a sixth segment hinge 156, a seventh segment hinge 157, and an eighth segment hinge 158.

The first segment hinge 151 is the segment hinge selected from the plurality of segment hinges 112 that attaches the first ladder segment 141 to the second ladder segment 142. The second segment hinge 152 is the segment hinge selected from the plurality of segment hinges 112 that attaches the first ladder segment 141 to the second ladder segment 142.

The third segment hinge 153 is the segment hinge selected from the plurality of segment hinges 112 that attaches the second ladder segment 142 to the third ladder segment 143. The fourth segment hinge 154 is the segment hinge selected from the plurality of segment hinges 112 that attaches the second ladder segment 142 to the third ladder segment 143.

The fifth segment hinge 155 is the segment hinge selected from the plurality of segment hinges 112 that attaches the third ladder segment 143 to the fourth ladder segment 144. The sixth segment hinge 156 is the segment hinge selected from the plurality of segment hinges 112 that attaches the third ladder segment 143 to the fourth ladder segment 144.

The seventh segment hinge 157 is the segment hinge selected from the plurality of segment hinges 112 that attaches the fourth ladder segment 144 to the fifth ladder segment 145. The eighth segment hinge 158 is the segment hinge selected from the plurality of segment hinges 112 that attaches the fourth ladder segment 144 to the fifth ladder segment 145.

Each slipover brace selected from the plurality of slipover braces 113 is a hollow tubular structure. Each slipover brace selected from the plurality of slipover braces 113 slides over a rail selected from the plurality of rails 132 of an individual ladder segment 131 selected from the plurality of ladder segments 111. Each slipover brace selected from the plurality of slipover braces 113 locks the position of a first rail selected from the plurality of rails 132 of a first individual ladder segment 131 selected from the plurality of ladder segments 111 into a fixed position relative to a second rail selected from the plurality of rails 132 of a second individual ladder segment 131 selected from the plurality of ladder segments 111.

Each slipover brace selected from the plurality of slipover braces 113 is sized such that the hollow interior of the selected slipover brace can simultaneously contain: a) the first rail associated with the selected slipover brace; b) the second rail associated with the selected slipover brace; and c) a hinge selected from the plurality of segment hinges 112 that attaches the associated first rail to the associated second rail.

The plurality of slipover braces 113 comprises a first slipover brace 161, a second slipover brace 162, a third slipover brace 163, a fourth slipover brace 164, a fifth slipover brace 165, a sixth slipover brace 166, a seventh slipover brace 167, and an eighth slipover brace 168.

The first slipover brace 161 is the segment brace selected from the plurality of slipover braces 113 that prevents the second ladder segment 142 from rotating relative to the first ladder segment 141. The second slipover brace 162 is the segment brace selected from the plurality of slipover braces 113 that prevents the second ladder segment 142 from rotating relative to the first ladder segment 141.

The third slipover brace 163 is the segment brace selected from the plurality of slipover braces 113 that prevents the third ladder segment 143 from rotating relative to the second ladder segment 142. The fourth slipover brace 164 is the segment brace selected from the plurality of slipover braces 113 that prevents the third ladder segment 143 from rotating relative to the second ladder segment 142.

The fifth slipover brace 165 is the segment brace selected from the plurality of slipover braces 113 that prevents the fourth ladder segment 144 from rotating relative to the third ladder segment 143. The sixth slipover brace 166 is the segment brace selected from the plurality of slipover braces 113 that prevents the fourth ladder segment 144 from rotating relative to the third ladder segment 143.

The seventh slipover brace 167 is the segment brace selected from the plurality of slipover braces 113 that prevents the fifth ladder segment 145 from rotating relative to the fourth ladder segment 144. The eighth slipover brace 168 is the segment brace selected from the plurality of slipover braces 113 that prevents the fifth ladder segment 145 from rotating relative to the fourth ladder segment 144.

Each of the plurality of foot cushions 114 is an elastomeric structure. Each of the plurality of foot cushions 114 attaches to a rail selected from the plurality of rails 132 of an individual ladder segment 131 selected from the plurality of ladder segments 111. Each of the plurality of foot cushions 114 form the inferior structure of the collapsible ladder 101 while in the extended position 262 such that the surface supporting the collapsible ladder 101 is not damaged by the collapsible ladder 101.

The plurality of foot cushions 114 comprises a first foot cushion 171 and a second foot cushion 172. The first foot cushion 171 is the elastomeric structure selected from the plurality of foot cushions 114 that encloses a first rung selected from the plurality of rungs 133 of the first ladder segment 141. The second foot cushion 172 is the elastomeric structure selected from the plurality of foot cushions 114 that encloses a second rung selected from the plurality of rungs 133 of the first ladder segment 141.

Each of the plurality of standoff legs 115 is a mechanical structure. Each of the plurality of standoff legs 115 is a rotating structure. Each of the plurality of foot cushions 114 attaches to a rail selected from the plurality of rails 132 of an individual ladder segment 131 selected from the plurality of ladder segments 111. Each of the plurality of standoff legs 115 forms a beam structure that holds the superior end of the collapsible ladder 101 away from the vertical surface that is supporting the collapsible ladder 101 while in the extended position 262. Each of the plurality of standoff legs 115 is a rotating structure such that the position of each of the plurality of standoff legs 115 can rotate relative to the collapsible ladder 101. The plurality of standoff legs 115 comprises a first standoff leg 181 and a second standoff leg 182.

The first standoff leg 181 is a rotating structure selected from the plurality of standoff legs 115 that attaches to the superior end of a rail selected from the plurality of rails 132 of the fifth ladder segment 145. The first standoff leg 181 comprises a first standoff beam 231, a first standoff hinge 241, and a first standoff cushion 251. The first standoff beam 231 is a shaft structure that provides the horizontal extension that separates the collapsible ladder 101 from a vertical surface while the collapsible ladder 101 is in the extended position 262. The first standoff hinge 241 is a hinge that attaches the first standoff beam 231 to the fifth ladder segment 145. The first standoff cushion 251 is an elastomeric structure. The first standoff cushion 251 attaches to the end of the first standoff beam 231 that is distal from the first standoff hinge 241. The first standoff cushion 251 prevents the collapsible ladder 101 from damaging the vertical surface.

The second standoff leg 182 is a rotating structure selected from the plurality of standoff legs 115 that attaches to the superior end of a rail selected from the plurality of rails 132 of the fifth ladder segment 145. The second standoff leg 182 comprises a second standoff beam 232, a second standoff hinge 242, and a second standoff cushion 252. The second standoff beam 232 is a shaft structure that provides the horizontal extension that separates the collapsible ladder 101 from a vertical surface while the collapsible ladder 101 is in the extended position 262. The second standoff hinge 242 is a hinge that attaches the second standoff beam 232 to the fifth ladder segment 145. The second standoff cushion 252 is an elastomeric structure. The second standoff cushion 252 attaches to the end of the second standoff beam 232 that is distal from the second standoff hinge 242. The second standoff cushion 252 prevents the collapsible ladder 101 from damaging the vertical surface.

The following eleven paragraphs describe the assembly of the collapsible ladder 101.

The first foot cushion 171 attaches to the end of the first left rail of the first ladder segment 141 that is proximal to the first inferior rung of the first ladder segment 141. The second foot cushion 172 attaches to the end of the first right rail of the first ladder segment 141 that is proximal to the first inferior rung of the first ladder segment 141.

The first segment hinge 151 attaches: a) the end of the first left rail of the first ladder segment 141 that is proximal to the first superior rung; to the; b) end of the second left rail that is proximal to the second inferior rung of the second ladder segment 142. The second segment hinge 152 attaches: a) the end of the first right rail of the first ladder segment 141 that is proximal to the first superior rung; to the; b) end of the second right rail that is proximal to the second inferior rung of the second ladder segment 142.

The third segment hinge 153 attaches: a) the end of the second left rail of the second ladder segment 142 that is proximal to the second superior rung; to the; b) end of the third left rail that is proximal to the third inferior rung of the third ladder segment 143. The fourth segment hinge 154 attaches: a) the end of the second right rail of the second ladder segment 142 that is proximal to the second superior rung; to the; b) end of the third right rail that is proximal to the third inferior rung of the third ladder segment 143.

The fifth segment hinge 155 attaches: a) the end of the third left rail of the third ladder segment 143 that is proximal to the third superior rung; to the; b) end of the fourth left rail that is proximal to the fourth inferior rung of the fourth ladder segment 144. The sixth segment hinge 156 attaches: a) the end of the third right rail of the third ladder segment 143 that is proximal to the third superior rung; to the; b) end of the fourth right rail that is proximal to the fourth inferior rung of the fourth ladder segment 144.

The seventh segment hinge 157 attaches: a) the end of the fourth left rail of the fourth ladder segment 144 that is proximal to the fourth superior rung; to the; b) end of the fifth left rail that is proximal to the fifth inferior rung of the fifth ladder segment 145. The eighth segment hinge 158 attaches: a) the end of the fourth right rail of the fourth ladder segment 144 that is proximal to the fourth superior rung; to the; b) end of the fifth right rail that is proximal to the fifth inferior rung of the fifth ladder segment 145.

The first slipover brace 161 slides over the second left rail of the second ladder segment 142. The first slipover brace 161 simultaneously slides over the second left rail of the second ladder segment 142, the first segment hinge 151, and the first left rail of the first ladder segment 141 to lock the collapsible ladder 101 into the extended position 262. The second slipover brace 162 slides over the second right rail of the second ladder segment 142. The second slipover brace 162 simultaneously slides over the second right rail of the second ladder segment 142, the second segment hinge 152, and the first right rail of the first ladder segment 141 to lock the collapsible ladder 101 into the extended position 262.

The third slipover brace 163 slides over the third left rail of the third ladder segment 143. The third slipover brace 163 simultaneously slides over the third left rail of the third ladder segment 143, the third segment hinge 153, and the second left rail of the second ladder segment 142 to lock the collapsible ladder 101 into the extended position 262. The fourth slipover brace 164 slides over the third right rail of the third ladder segment 143. The fourth slipover brace 164 simultaneously slides over the third right rail of the third ladder segment 143, the fourth segment hinge 154, and the second right rail of the second ladder segment 142 to lock the collapsible ladder 101 into the extended position 262.

The fifth slipover brace 165 slides over the fourth left rail of the fourth ladder segment 144. The fifth slipover brace 165 simultaneously slides over the fourth left rail of the fourth ladder segment 144, the fifth segment hinge 155, and the third left rail of the third ladder segment 143 to lock the collapsible ladder 101 into the extended position 262. The sixth slipover brace 166 slides over the fourth right rail of the fourth ladder segment 144. The sixth slipover brace 166 simultaneously slides over the fourth right rail of the fourth ladder segment 144, the sixth segment hinge 156, and the third right rail of the third ladder segment 143 to lock the collapsible ladder 101 into the extended position 262.

The seventh slipover brace 167 slides over the fifth left rail of the fifth ladder segment 145. The seventh slipover brace 167 simultaneously slides over the fifth left rail of the fifth ladder segment 145, the seventh segment hinge 157, and the fourth left rail of the fourth ladder segment 144 to lock the collapsible ladder 101 into the extended position 262. The eighth slipover brace 168 slides over the fifth right rail of the fifth ladder segment 145. The eighth slipover brace 168 simultaneously slides over the fifth right rail of the fifth ladder segment 145, the eighth segment hinge 158, and the fourth right rail of the fourth ladder segment 144 to lock the collapsible ladder 101 into the extended position 262.

The first standoff leg 181 attaches to the end of the fifth left rail of the fifth ladder segment 145 that is proximal to the fifth superior rung of the fifth ladder segment 145. The first standoff hinge 241 attaches the first standoff beam 231 to the fifth left rail of the fifth ladder segment 145 such that the first standoff beam 231 rotates relative to the fifth ladder segment 145.

The first standoff cushion 251 attaches to the end of the first standoff beam 231 that is distal from the first standoff hinge 241. The second standoff leg 182 attaches to the end of the fifth right rail of the fifth ladder segment 145 that is proximal to the fifth superior rung of the fifth ladder segment 145. The second standoff hinge 242 attaches the second standoff beam 232 to the fourth right rail of the fifth ladder segment 145 such that the second standoff beam 232 rotates relative to the fifth ladder segment 145. The second standoff cushion 252 attaches to the end of the second standoff beam 232 that is distal from the second standoff hinge 242.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Beam: As used in this disclosure, a beam is a horizontally oriented shaft that: 1) is suspended above a supporting surface; and, 2) bears a load.

Box: As used in this disclosure, a box is a hollow prism-shaped structure used to store one or more objects.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Cushion: As used in this disclosure a cushion is a structure formed with a pad that is used to prevent injury or damage to a person or object.

Collapsible: As used in this disclosure, the terms collapsible refers to an object that is configured such that the volume of the object is adjustable. The verb collapse means that the volume of the object is adjusted from a larger volume to a smaller volume. The verbs expand and deploy mean that the volume of the object is adjusted from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar. Use Prism, pyramid, geometrically similar, truncated, align Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Flush: As used in this disclosure, the term flush is used to describe the alignment of a first surface and a second surface on a single plane.

Fold: As used in this disclosure, to fold means to bend an object back upon itself.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object. A hinge designed to be fixed into a set position after rotation is called a locking hinge.

Horizontal: As used in this disclosure, horizontal is a directional term that refers to a direction that is either: 1)

parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Ladder: As used in this disclosure, a ladder is a climbing structure formed from rails and rungs used by an individual to change their elevation. The rails are joined by the rungs. The rungs are mounted horizontally. The rails provide the vertical support for the ladder. The rungs form the step structures used to change elevation.

Lid: As used in this disclosure, a lid is a removable cover that is placed over an opening of a hollow structure to enclose the hollow structure.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein an end of prism structure of the pan and a portion of the lateral face of the pan is also open.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Perimeter: As used in this disclosure, a perimeter is one or more curved or straight lines that bounds an enclosed area on a plane or surface. The perimeter of a circle is commonly referred to as a circumference.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, a right sidewall, and an end wall.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Rotation: As used in this disclosure, rotation refers to the cyclic movement of an object around a fixed point or fixed axis. The verb of rotation is to rotate.

Tube: As used in this disclosure, the term tube is used to describe a rigid hollow prism-shaped device with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Vehicle: As used in this disclosure, a vehicle is a motorized device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A truck bed ladder comprising
a collapsible ladder and a bed box;
wherein the collapsible ladder is stored in the bed box;
wherein the truck bed ladder is configured for use with a pickup truck;
wherein the pickup truck is further defined with a bed;
wherein the bed box is accessed through the bed of the pickup truck;
wherein the collapsible ladder is a collapsible structure, which collapses into a rectangular block structure;
wherein the collapsible ladder deploys into a linear structure;
wherein the collapsible ladder is further defined with a collapsed position and an extended position;
wherein the collapsed position is the position of the collapsible ladder when the collapsible ladder is folded into a storage position;
wherein the extended position is the position of the collapsible ladder when the collapsible ladder is extended;
wherein the bed box is a hollow containment structure;
wherein the bed box is a prism-shaped structure;
wherein the bed box contains the collapsible ladder when the collapsible ladder is in the collapsed position;
wherein the collapsible ladder is a mechanical structure;
wherein the collapsible ladder is a rotating structure;
wherein the collapsible ladder folds on itself to collapse into the collapsed position;
wherein the bed box comprises a pan, a lid, a bed box hinge, and a handle;
wherein the bed box hinge attaches the lid to the pan;
wherein the handle attaches to the lid;
wherein the collapsible ladder comprises a plurality of ladder segments, a plurality of segment hinges, a plurality of slipover braces, a plurality of foot cushions, and a plurality of standoff legs;
wherein each of the plurality of ladder segments is a ladder;
wherein each of the plurality of ladder segments forms a portion of the climbing structure of the collapsible ladder;
wherein the plurality of ladder segments comprises a collection of individual ladder segments;
wherein each individual ladder segment is a ladder;
wherein any first individual ladder segment selected from the plurality of ladder segments attaches to a second individual ladder segment selected from the plurality of ladder segments to form the collapsible ladder;
wherein any first individual ladder segment selected from the plurality of ladder segments rotates relative to a second individual ladder segment selected from the plurality of ladder segments such that the collapsible ladder deploys into the extended position and folds into the collapsed position;
wherein each individual ladder segment comprises a plurality of rails and a plurality of rungs;
wherein the plurality of rails are stanchion structures that vertically support the plurality of rungs of the individual ladder segment when the collapsible ladder is in the extended position;
wherein the plurality of rungs are beam structures that horizontally stabilize the plurality of rails of the individual ladder segment when the collapsible ladder is in the extended position;
wherein the plurality of rungs forms the horizontally oriented support that allows an individual to elevate themselves above a supporting surface;
wherein each of the plurality of segment hinges is a hinge;
wherein each of the plurality of segment hinges attaches a first rail selected from the plurality of rails of a first individual ladder segment selected from the plurality of ladder segments to a second rail selected from the plurality of rails of a second individual ladder segment selected from the plurality of ladder segments;
wherein each segment hinge selected from the plurality of segment hinges attaches the first rail to the second rail such that the first rail rotates relative to the second rail;
wherein the plurality of segment hinges interconnect the plurality of ladder segments such that any first individual ladder segment selected from the plurality of ladder segments rotates relative to any second individual ladder segment selected from the plurality of ladder segments;
wherein each slipover brace selected from the plurality of slipover braces is a hollow tubular structure;
wherein each slipover brace selected from the plurality of slipover braces slides over a rail selected from the plurality of rails of an individual ladder segment selected from the plurality of ladder segments;
wherein each slipover brace selected from the plurality of slipover braces locks the position of a first rail selected from the plurality of rails of a first individual ladder segment selected from the plurality of ladder segments into a fixed position relative to a second rail selected from the plurality of rails of a second individual ladder segment selected from the plurality of ladder segments;
wherein each slipover brace selected from the plurality of slipover braces is sized such that the hollow interior of the selected slipover brace can simultaneously contain: a) the first rail associated with the selected slipover brace; b) the second rail associated with the selected slipover brace; and c) a hinge selected from the plurality of segment hinges that attaches the associated first rail to the associated second rail;
wherein each of the plurality of foot cushions is an elastomeric structure;
wherein each of the plurality of foot cushions attaches to a rail selected from the plurality of rails of an individual ladder segment selected from the plurality of ladder segments;
wherein each of the plurality of foot cushions form the inferior structure of the collapsible ladder while in the extended position such that the surface supporting the collapsible ladder is not damaged by the collapsible ladder;
wherein each of the plurality of standoff legs is a mechanical structure;
wherein each of the plurality of standoff legs is a rotating structure;
wherein each of the plurality of foot cushions attaches to a rail selected from the plurality of rails of an individual ladder segment selected from the plurality of ladder segments;
wherein each of the plurality of standoff legs forms a beam structure that holds the superior end of the collapsible ladder away from the vertical surface that is supporting the collapsible ladder while in the extended position;

wherein each of the plurality of standoff legs is a rotating structure such that the position of each of the plurality of standoff legs can rotate relative to the collapsible ladder.

2. A truck bed ladder according to claim 1
wherein the pan is a hollow structure;
wherein the pan is a prism-shaped structure;
wherein the pan has a pan structure;
wherein the pan is sized such that the pan receives the collapsible ladder when the collapsible ladder is in the collapsed position.

3. A truck bed ladder according to claim 2
wherein the pan mounts below the horizontal surface formed by the bed of the pickup truck such that the pan will not interfere with cargo stored on the bed of the pickup truck;
wherein the open face of the pan is the superior face of the pan such that the interior of the pan is accessible through the bed of the pickup truck.

4. A truck bed ladder according to claim 3
wherein the lid is a disk-shaped structure;
wherein the lid is geometrically similar to the pan such that the lid encloses the open face of the pan;
wherein the lid encloses the open face of the pan;
wherein the lid attaches to the pan such that the lid rotates relative to the pan.

5. A truck bed ladder according to claim 4 wherein the lid mounts within the bed of the pickup truck such that the lid is flush with the superior surface of the bed when the lid encloses the hollow interior storage space of the pan.

6. A truck bed ladder according to claim 5
wherein the bed box hinge is a hinge;
wherein the bed box hinge attaches the lid to the pan such that the lid rotates relative to the pan;
wherein the handle is a grip that attaches to the lid;
wherein the handle is used to manipulate the lid.

7. A truck bed ladder according to claim 6
wherein the plurality of ladder segments are interconnected to each other to form the collapsible ladder;
wherein any individual ladder segment selected from the plurality of ladder segments rotates relative any individual ladder segment remaining in the plurality of ladder segments;
wherein any individual ladder segment selected from the plurality of ladder segments locks into a fixed position relative to the individual ladder segment remaining in the plurality of ladder segments when the collapsible ladder is in the extended position;
wherein the plurality of ladder segments fold on top of each other to collapse the collapsible ladder into the collapsed position.

8. A truck bed ladder according to claim 7
wherein the plurality of rails comprises a left rail and a right rail;
wherein the left rail is the rail of the individual ladder segment that is in a position to the left of the right rail when the individual ladder segment is viewed from the front;
wherein the right rail is the rail of the individual ladder segment that is in a position to the right of the left rail when the individual ladder segment is viewed from the front;
wherein the plurality of rungs comprises a superior rung and an inferior rung;
wherein the superior rung is the rung of the individual ladder segment that is in a superior position relative to the inferior rung when the individual ladder segment is viewed from the front;
wherein the inferior rung is the rung of the individual ladder segment that is in an inferior position relative to the superior rung when the individual ladder segment is viewed from the front.

9. A truck bed ladder according to claim 8
wherein the plurality of ladder segments further comprises a first ladder segment, a second ladder segment, a third ladder segment, a fourth ladder segment, and a fifth ladder segment;
wherein the first ladder segment forms the inferior structure of the collapsible ladder when the collapsible ladder is in the extended position;
wherein the first ladder segment attaches to the second ladder segment;
wherein the first ladder segment is further defined with a first left rail, a first right rail, a first superior rung, and a first inferior rung;
wherein the second ladder segment forms a portion of the structure of the collapsible ladder when the collapsible ladder is in the extended position;
wherein the second ladder segment attaches to the first ladder segment and the third ladder segment;
wherein the second ladder segment is further defined with a second left rail, a second right rail, a second superior rung, and a second inferior rung;
wherein the third ladder segment forms a portion of the structure of the collapsible ladder when the collapsible ladder is in the extended position;
wherein the third ladder segment attaches to the second ladder segment and the fourth ladder segment;
wherein the third ladder segment is further defined with a third left rail, a third right rail, a third superior rung, and a third inferior rung;
wherein the fourth ladder segment forms a portion of the structure of the collapsible ladder when the collapsible ladder is in the extended position;
wherein the fourth ladder segment attaches to the third ladder segment and the fifth ladder segment;
wherein the fourth ladder segment is further defined with a fourth left rail, a fourth right rail, a fourth superior rung, and a fourth inferior rung;
wherein the fifth ladder segment forms the superior structure of the collapsible ladder when the collapsible ladder is in the extended position;
wherein the fifth ladder segment attaches to the fourth ladder segment;
wherein the fifth ladder segment is further defined with a fifth left rail, a fifth right rail, a fifth superior rung, and a fifth inferior rung.

10. A truck bed ladder according to claim 9
wherein the plurality of segment hinges comprises a first segment hinge, a second segment hinge, a third segment hinge, a fourth segment hinge, a fifth segment hinge, a sixth segment hinge, a seventh segment hinge, and an eighth segment hinge;
wherein the first segment hinge is the segment hinge selected from the plurality of segment hinges that attaches the first ladder segment to the second ladder segment;
wherein the second segment hinge is the segment hinge selected from the plurality of segment hinges that attaches the first ladder segment to the second ladder segment;

wherein the third segment hinge is the segment hinge selected from the plurality of segment hinges that attaches the second ladder segment to the third ladder segment;
wherein the fourth segment hinge is the segment hinge selected from the plurality of segment hinges that attaches the second ladder segment to the third ladder segment;
wherein the fifth segment hinge is the segment hinge selected from the plurality of segment hinges that attaches the third ladder segment to the fourth ladder segment;
wherein the sixth segment hinge is the segment hinge selected from the plurality of segment hinges that attaches the third ladder segment to the fourth ladder segment;
wherein the seventh segment hinge is the segment hinge selected from the plurality of segment hinges that attaches the fourth ladder segment to the fifth ladder segment;
wherein the eighth segment hinge is the segment hinge selected from the plurality of segment hinges that attaches the fourth ladder segment to the fifth ladder segment.

11. A truck bed ladder according to claim 10
wherein the plurality of slipover braces comprises a first slipover brace, a second slipover brace, a third slipover brace, a fourth slipover brace, a fifth slipover brace, a sixth slipover brace, a seventh slipover brace, and an eighth slipover brace;
wherein the first slipover brace is the segment brace selected from the plurality of slipover braces that prevents the second ladder segment from rotating relative to the first ladder segment;
wherein the second slipover brace is the segment brace selected from the plurality of slipover braces that prevents the second ladder segment from rotating relative to the first ladder segment;
wherein the third slipover brace is the segment brace selected from the plurality of slipover braces that prevents the third ladder segment from rotating relative to the second ladder segment;
wherein the fourth slipover brace is the segment brace selected from the plurality of slipover braces that prevents the third ladder segment from rotating relative to the second ladder segment;
wherein the fifth slipover brace is the segment brace selected from the plurality of slipover braces that prevents the fourth ladder segment from rotating relative to the third ladder segment;
wherein the sixth slipover brace is the segment brace selected from the plurality of slipover braces that prevents the fourth ladder segment from rotating relative to the third ladder segment;
wherein the seventh slipover brace is the segment brace selected from the plurality of slipover braces that prevents the fifth ladder segment from rotating relative to the fourth ladder segment;
wherein the eighth slipover brace is the segment brace selected from the plurality of slipover braces that prevents the fifth ladder segment from rotating relative to the fourth ladder segment.

12. A truck bed ladder according to claim 11
wherein the plurality of foot cushions comprises a first foot cushion and a second foot cushion;
wherein the first foot cushion is the elastomeric structure selected from the plurality of foot cushions that encloses a first rung selected from the plurality of rungs of the first ladder segment;
wherein the second foot cushion is the elastomeric structure selected from the plurality of foot cushions that encloses a second rung selected from the plurality of rungs of the first ladder segment.

13. A truck bed ladder according to claim 12
wherein the plurality of standoff legs comprises a first standoff leg and a second standoff leg;
wherein the first standoff leg is a rotating structure selected from the plurality of standoff legs that attaches to the superior end of a rail selected from the plurality of rails of the fifth ladder segment;
wherein the second standoff leg is a rotating structure selected from the plurality of standoff legs that attaches to the superior end of a rail selected from the plurality of rails of the fifth ladder segment.

14. A truck bed ladder according to claim 13
wherein the first standoff leg comprises a first standoff beam, a first standoff hinge, and a first standoff cushion;
wherein the first standoff beam is a shaft structure that provides the horizontal extension that separates the collapsible ladder from a vertical surface while the collapsible ladder is in the extended position;
wherein the first standoff hinge is a hinge that attaches the first standoff beam to the fifth ladder segment;
wherein the first standoff cushion is an elastomeric structure;
wherein the first standoff cushion attaches to the end of the first standoff beam that is distal from the first standoff hinge;
wherein the first standoff cushion prevents the collapsible ladder from damaging the vertical surface;
wherein the second standoff leg comprises a second standoff beam, a second standoff hinge, and a second standoff cushion;
wherein the second standoff beam is a shaft structure that provides the horizontal extension that separates the collapsible ladder from a vertical surface while the collapsible ladder is in the extended position;
wherein the second standoff hinge is a hinge that attaches the second standoff beam to the fifth ladder segment;
wherein the second standoff cushion is an elastomeric structure;
wherein the second standoff cushion attaches to the end of the second standoff beam that is distal from the second standoff hinge;
wherein the second standoff cushion prevents the collapsible ladder from damaging the vertical surface.

15. A truck bed ladder according to claim 14
wherein the first foot cushion attaches to the end of the first left rail of the first ladder segment that is proximal to the first inferior rung of the first ladder segment;
wherein the second foot cushion attaches to the end of the first right rail of the first ladder segment that is proximal to the first inferior rung of the first ladder segment;
wherein the first segment hinge attaches: a) the end of the first left rail of the first ladder segment that is proximal to the first superior rung; to the; b) end of the second left rail that is proximal to the second inferior rung of the second ladder segment;
wherein the second segment hinge attaches: a) the end of the first right rail of the first ladder segment that is proximal to the first superior rung; to the; b) end of the second right rail that is proximal to the second inferior rung of the second ladder segment;

wherein the third segment hinge attaches: a) the end of the second left rail of the second ladder segment that is proximal to the second superior rung; to the; b) end of the third left rail that is proximal to the third inferior rung of the third ladder segment;

wherein the fourth segment hinge attaches: a) the end of the second right rail of the second ladder segment that is proximal to the second superior rung; to the; b) end of the third right rail that is proximal to the third inferior rung of the third ladder segment;

wherein the fifth segment hinge attaches: a) the end of the third left rail of the third ladder segment that is proximal to the third superior rung; to the; b) end of the fourth left rail that is proximal to the fourth inferior rung of the fourth ladder segment;

wherein the sixth segment hinge attaches: a) the end of the third right rail of the third ladder segment that is proximal to the third superior rung; to the; b) end of the fourth right rail that is proximal to the fourth inferior rung of the fourth ladder segment;

wherein the seventh segment hinge attaches: a) the end of the fourth left rail of the fourth ladder segment that is proximal to the fourth superior rung; to the; b) end of the fifth left rail that is proximal to the fifth inferior rung of the fifth ladder segment;

wherein the eighth segment hinge attaches: a) the end of the fourth right rail of the fourth ladder segment that is proximal to the fourth superior rung; to the; b) end of the fifth right rail that is proximal to the fifth inferior rung of the fifth ladder segment;

wherein the first slipover brace slides over the second left rail of the second ladder segment;

wherein the first slipover brace simultaneously slides over the second left rail of the second ladder segment, the first segment hinge, and the first left rail of the first ladder segment to lock the collapsible ladder into the extended position;

wherein the second slipover brace slides over the second right rail of the second ladder segment;

wherein the second slipover brace simultaneously slides over the second right rail of the second ladder segment, the second segment hinge, and the first right rail of the first ladder segment to lock the collapsible ladder into the extended position;

wherein the third slipover brace slides over the third left rail of the third ladder segment;

wherein the third slipover brace simultaneously slides over the third left rail of the third ladder segment, the third segment hinge, and the second left rail of the second ladder segment to lock the collapsible ladder into the extended position;

wherein the fourth slipover brace slides over the third right rail of the third ladder segment;

wherein the fourth slipover brace simultaneously slides over the third right rail of the third ladder segment, the fourth segment hinge, and the second right rail of the second ladder segment to lock the collapsible ladder into the extended position;

wherein the fifth slipover brace slides over the fourth left rail of the fourth ladder segment;

wherein the fifth slipover brace simultaneously slides over the fourth left rail of the fourth ladder segment, the fifth segment hinge, and the third left rail of the third ladder segment to lock the collapsible ladder into the extended position;

wherein the sixth slipover brace slides over the fourth right rail of the fourth ladder segment;

wherein the sixth slipover brace simultaneously slides over the fourth right rail of the fourth ladder segment, the sixth segment hinge, and the third right rail of the third ladder segment to lock the collapsible ladder into the extended position;

wherein the seventh slipover brace slides over the fifth left rail of the fifth ladder segment;

wherein the seventh slipover brace simultaneously slides over the fifth left rail of the fifth ladder segment, the seventh segment hinge, and the fourth left rail of the fourth ladder segment to lock the collapsible ladder into the extended position;

wherein the eighth slipover brace slides over the fifth right rail of the fifth ladder segment;

wherein the eighth slipover brace simultaneously slides over the fifth right rail of the fifth ladder segment, the eighth segment hinge, and the fourth right rail of the fourth ladder segment to lock the collapsible ladder into the extended position;

wherein the first standoff leg attaches to the end of the fifth left rail of the fifth ladder segment that is proximal to the fifth superior rung of the fifth ladder segment;

wherein the first standoff hinge attaches the first standoff beam to the fifth left rail of the fifth ladder segment such that the first standoff beam rotates relative to the fifth ladder segment;

wherein the first standoff cushion attaches to the end of the first standoff beam that is distal from the first standoff hinge;

wherein the second standoff leg attaches to the end of the fifth right rail of the fifth ladder segment that is proximal to the fifth superior rung of the fifth ladder segment;

wherein the second standoff hinge attaches the second standoff beam to the fourth right rail of the fifth ladder segment such that the second standoff beam rotates relative to the fifth ladder segment;

wherein the second standoff cushion attaches to the end of the second standoff beam that is distal from the second standoff hinge.

\* \* \* \* \*